D.C. CONTROLLED DYNAMIC FOCUS CIRCUIT
Filed Sept. 18, 1964
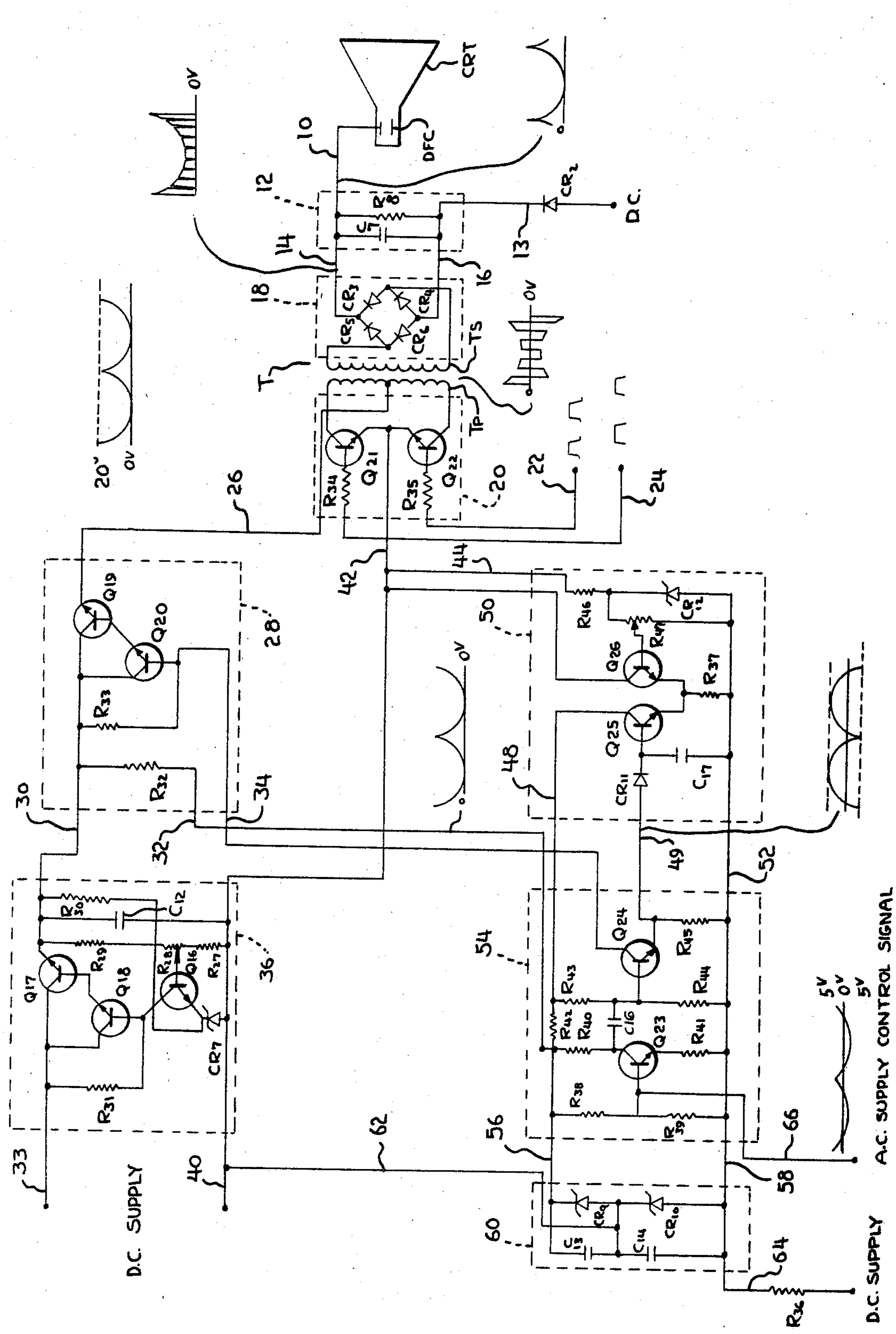

3,412,281

D.C. CONTROLLED DYNAMIC FOCUS CIRCUIT

George Gilman Richards, Jr., Middletown, and Richard Farner Wells, Elizabethtown, Pa., assignors to AMP Incorporated, Harrisburg, Pa.

Filed Sept. 18, 1964, Ser. No. 397,379
7 Claims. (Cl. 315—22)

ABSTRACT OF THE DISCLOSURE

A dynamic focusing circuit for cathode ray tubes is disclosed which employs an A.C. control signal which is proportional to distortion due to defocusing inherent in tube faces, the A.C. control signal being converted into a D.C. control signal which may be added directly to the relatively high level constant voltage supplied by the tube focusing circuit. The invention circuit is all solid state and provides isolation to prevent the circuit from being affected by the relatively high tube focusing voltage.

*Background of the invention*

Considerable effort has been put forth by workers in the art to develop dynamic focusing circuits for cathode ray tubes which will automatically compensate for distortion due to defocusing inherent in tube faces which are or must be substantially flat. One example of an application wherein a flat face tube is required is in uses wherein reproduction or duplication equipment is arranged to function directly from the face of the cathode ray tube. With this application and the reproduction of data carried on the face of the tube it is important that the peripheral areas not be distorted, since such distortion will appear on the reproduction.

Certain of the prior art efforts to provide dynamic focusing circuits have resulted in arrangements wherein a corrective voltage is generated which varies as the electron beam sweeps across the face of a tube, an example of this being shown in U.S. Patent No. 2,698,400 which is directed to a vacuum tube circuit. Another example is shown in U.S. Patent No. 3,084,276 which is directed to a transistorized dynamic focus circuit for a magnetically-focused cathode ray tube. Still other dynamic focus circuit approaches are employed in color cathode ray tubes, such as in U.S. Patent No. 2,801,363.

*Summary of the invention*

This invention relates to an improved beam focusing circuit for cathode ray tubes with objectives including:

(1) The provision of an all solid state dynamic focusing circuit which is more efficient and more stable than heretofore available.

(2) The provision of a dynamic focusing circuit which employs standard A.C. supply control signals through an efficient conversion to a D.C. control signal which varies in a parabolic sense to compensate directly for sweep distortion.

Other objects and attainments of the present invention will become apparent to those skilled in the art upon a reading of the following detailed description when taken in conjunction with the drawing in which is shown and described an illustrative embodiment of the invention; it is to be understood, however, that this embodiment is not intended to be exhaustive nor limiting of the invention, but is given for purposes of illustration in order that others skilled in the art may fully understand the invention and the principles thereof and the manner of applying it in practical use so that they may modify it in various forms, each as may be best suited to the conditions of a particular use.

In the drawing:

FIGURE 1 is a schematic diagram showing the circuit of the invention in relation to a cathode ray tube including representations of the various signals formed by the components of the circuit and by the circuit itself.

*Description of preferred embodiment of the invention*

Referring now to the circuit of the invention in general, the cathode ray tube, CRT, is of standard construction wherein the face of a tube is either flat or slightly curved. For the circuit actually shown, the CRT may be considered as the type employing electro-static focusing and deflection control rather than the magnetic control employed in certain CRT devices, although it is contemplated that the invention may be employed with magnetically controlled tubes with modifications which should be apparent to those skilled in the art by following the teachings given herein. Thus, with respect to CRT the electro-static plates are represented as DFC driven via lead 10 which is the output of the circuit of the invention. The wave shape associated with lead 10, as can be seen in FIGURE 1, is a parabolic form and is of a D.C. level. This wave form represents the net corrective voltage applied during one period or sweep of the electron beam across the face of the tube, it being apparent that at the extremities of the sweep the degree of defocusing is considerably greater than at the center of the sweep, thus requiring a greater instantaneous focusing voltage.

The input via lead 10 of the D.C. control voltage is derived from a D.C. pulse wave form via leads 14 and 16, having a parabolic envelope through being impressed upon an existing relatively high, D.C. level focus voltage from lead 13 and through a smoothing circuit 12. The circuit 12 is supplied by a full-wave rectifier 18 which converts an A.C. pulse wave shape, as indicated, from the secondary $T_s$ of transformer T, which is driven by the primary $T_p$ under the control of a switching circuit 20 gated by pulses supplied via leads 22 and 24. The supply to 20 by lead 26 is from a power amplification stage 28 which is supplied by a voltage regulator 36 from an available D.C. supply. The power amplification stage 28 produces the D.C. parabolic wave shape indicated from a lower level wave shape of similar configuration supplied via lead 34, from a signal amplification stage 54, which is fed by a D.C. supply via leads 32 and 64 through a voltage regulator 60. Amplifier stage 54 serves to amplify a low level input A.C. supply control signal placed on an input lead 66. The output of 54 is constantly and correctively referenced to zero potential by a D.C. restoring stage 50.

In operation, based upon an A.C. supply control signal of the wave form shown, the invention circuit provides a pure, true D.C. input of parabolic shape to the dynamic focusing plates of the cathode ray tube through a circuit which is all solid state and which requires in addition thereto to relatively simple D.C. supplies which are both regulated individually, plus a source of gating pulses which are derived from a standard source available in CRT systems and which are not particularly critical either in phase, amplitude or width. The D.C. control voltage developed by the circuit of the invention from the A.C. supply cycle is impressed directly upon the D.C. focusing voltage. Through the use of the D.C. restoring stage and circuit adjustments incorporated therein an inherent stability in the over-all focusing circuit of the invention is provided which accommodates for A.C. control signal variations automatically.

In an actual crcuit the following parameters were present. The CRT was driven by a D.C. level of parabolic wave form of the configuration indicated and of a voltage level from zero to 200 volts and by an A.C. supply control signal generally of parabolic wave shape of five volts amplitude. The upper and lower D.C. supplies of the circuit shown in FIGURE 1 were about 30 volts and the D.C. focus voltage was approximately 1900 to 2500 volts. The gating pulses were positive and negative pulses of approximately 4 volts amplitude and 250 microseconds duration.

Turning now to a closer look at the operation of the components forming the circuit of the invention, the circuit 12 through C7 and R8 serves to smooth out the pulses formed from the full wave rectifier 18, in essence filtering and filling in the portions between the pulses to add such directly to the existing D.C. level supplied via lead 13 through a diode CR2 which effectively decouples the focus voltage supply from the circuit. The full wave rectifier 18 is of standard construction to include four diodes CR3–CR7 tied to the secondary $T_s$ of T in a manner to produce a D.C. pulse level having a parabolic wave form as shown, from the A.C. pulse input on $T_s$.

Switching circuit 20 is connected to the primary $T_p$, such that the input to the center tap by lead 26 from the power amplifier 28 is caused to flow first through one half of the transformer as transistor Q21 is gated on and then through the other half as Q22 is gated to on and Q21 is extinguished. The gating pulses applied by a lead 24 are fed through resistors R34, R35 which are current limiting. The emitters of Q21 and Q22 are tied to lead 42 which in turn is tied to ground potential through the voltage regulator 36. By employing Q21 and Q22 in a mode of operation wherein they are driven to saturation for only a limited period of time the effective curent rating of the components is reduced with an incident saving in cost and an improved operation efficiency. Further, the push pull operation serves to establish isolation of the relatively low voltage control circuit from the high focus voltage.

The power regulator 36 serves to provide sufficient current to the D.C. referenced parabolic wave form input from 54 and operates through two transistors Q19 and Q20 arranged in a standard Darlington hook-up. The collectors of Q19 and Q20 are tied in common to an input via a lead 30. The resistance R33 serves to control the voltage to the base of the Darlington network.

Voltage regulator 36 is a standard circuit including transistors Q17 and Q18 arranged in a Darlington hook-up to provide a voltage expressed across C12, which voltage is held constant, notwithstanding ripple variations in the input D.C. supply on lead 33, such input being at least enough to maintain conduction. Further included is a reference Zener CR7 which operates to permit Q16 to adjust to changes in voltage across the resistor chain R27–R29 to hold the voltage constant on level 30 to 28. The emitter of Q16 is tied to 30 via an impedance matching resistor R30 and resistor R31 operates to control the voltage between the collectors and the base of Q18.

Signal amplifier 54 is provided with a separate voltage regulator circuit 60 comprised of Zeners CR9 and CR10 which are in parallel with capacitors C13 and C14 which operate to filter the D.C. voltage as to ripple variations. The supply to Zener CR10 is by lead 64 through a resistor R36 which is current limiting and CR9 is supplied via 32 in the same manner. A separate lead is taken off between CR9 and CR10 and tied to ground at lead 40 as shown. This lead 62 functions to reference the amplifier to ground at 36. The output from 60 then supplies via 56 a voltage across resistors R38 and R39 which are tied to the base of Q23 along with the A.C. supply control signal supplied via lead 66. As the input signal via 66 varies then, Q23 operates to provide current gain, the resistance R41 acting to maintain a high input impedance to the A.C. amplifier and resistance R40 also operating to provide gain. The capacitor C16 is tied between the resistor R40 and a resistor R43 which is in series across the voltage supply to the base of Q24. This operates to couple the amplification stages. Resistor R45 being tied via 49 to the emitter of Q24 provides a control voltage for Q25 in the D.C. restorer 50 which is, in fact, a differential amplifier. Diode CR11 isolates the output from Q24 from the base of Q25 and capacitor C17 tied between the base of Q25 and ground serves as a storing capacitor to average out the A.C. signal on R45. Adjacent to Q25 is a further transistor Q26 which has its emitter in common with that of Q25 to a resistor R37 which is current limiting and tied to ground through lead 44 through a Zener CR12, resistances R46 and R47. R46 serves to make the circuit relatively independent of base current. The Zener CR12 holds the voltage constant across the base and emitter of Q26 and the circuit arrangement is such that Q25 and Q26 produce an output which is representative only of the difference between the voltages of the two transistors. Thus, by setting the pot including the resistance R47, the voltage may be tied to zero potential such that there is zero ouput with zero input to Q25. With an input which will be of the wave form shown, any output from 54 will be tied to zero potential so that the output from the power amplifier will be tied to zero potential to thus represent a D.C. level of parabolic wave shape. If variations in 54 result such that the voltage is greater than the effective operating D.C. point, then Q25 is biased on which draws current through R42 to change the bias point of Q24 and drop the D.C. point of operation.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. In a circuit for providing a dynamic focusing voltage to cathode ray tubes of the type which defocus during scanning, supply means adapted to provide a relatively high level constant voltage to the tube focusing circuit to hold the tube beam in focus at a single point of scan, a control signal supply adapted to provide a relatively low level A.C. control signal of a parabolic waveform directly related to the degree of defocus at the other points of scan as an input control signal, means for A.C. coupling said control signal into said circuit including a capacitor and a first amplifying stage, a second amplifying stage operable to boost said A.C. control signal to a level equal to the voltage necessary to correct for defocusing, and circuit means operable to convert said A.C. control signal to a D.C. control voltage of parabolic waveform and directly add said D.C. control voltage to said high level constant voltage to provide focusing for said tube throughout a given scan.

2. The circuit of claim 1 wherein said circuit means includes a differential amplifier operable to reference said A.C. control signal to zero potential.

3. In a circuit for providing a dynamic focusing voltage to cathode ray tubes of the type which defocus during scansion, supply means providing a relatively high level D.C. voltage to hold the tube beam in focus at a given point of scan, means for developing a relatively low D.C. level control signal corrective voltage having a waveform related to the degree of defocusing at other points of scan and means for adding said corrective voltage to said high level voltage including an isolating circuit comprised of a gate means driving the primary of a transformer to develop in the secondary thereof an A.C. pulse waveform having an envelope approximating the said D.C. signal waveform and means for rectifying and integrating said pulse waveform to provide said D.C. level control signal voltage, said last means being connected to the tube focusing circuit and to said high level voltage.

4. In a cathode ray tube driven by a relatively high level constant D.C. focusing voltage, a circuit for providing dynamic focusing throughout the tube beam scan including amplifying means adapted to convert a low level A.C. signal into a D.C. level control signal having waveform tied to zero potential so as to be directly added to said high level focusing voltage without subtracting from portions thereof, means to apply said D.C. level control signal to said focusing voltage including means to isolate said circuit from said focusing voltage to preclude said focusing voltage from affecting said amplifying means.

5. The circuit of claim 4 wherein said amplifying means includes a voltage amplifying stage and a power amplifying stage each separately supplied by voltage regulating means to reduce distortion in converting said signal.

6. In a circuit for providing a dynamic focusing voltage to cathode ray tubes of the type which defocus during scanning, supply means adapted to provide a relatively high level constant voltage to the tube focusing circuit to hold the tube beam in focus at a single point of scan, a control signal supply adapted to provide a relatively low level A.C. control signal of a parabolic waveform directly related to the degree of defocus at the other points of scan as an input control signal, means for A.C. coupling said control signal into said circuit including a capacitor and a first amplifying stage, a second amplifying stage operable to boost said A.C. control signal to a level equal to the voltage necessary to correct for defocusing, and circuit means operable to convert said A.C. control signal to a D.C. control voltage of parabolic waveform and directly add said D.C. control voltage to said high level constant voltage to provide focusing for said tube throughout a given scan, said circuit means including gate means linked to alternatively drive a transformer primary to produce an A.C. pulse waveform and means to develop therefrom a D.C. waveform equal to said D.C. control voltage.

7. The circuit of claim 6 wherein said gate means includes in circuit transistor means adapted to be driven into substantial saturation when gated to the on state.

References Cited

UNITED STATES PATENTS

| | | | |
|---|---|---|---|
| 2,951,965 | 9/1960 | Durnal | 315—22 |
| 3,146,373 | 8/1964 | Janssen | 315—22 |
| 3,156,873 | 11/1964 | Williams | 330—69 |
| 3,168,709 | 2/1965 | Sikorra | 330—69 X |
| 3,289,098 | 11/1966 | Cannalte | 321—2 X |

OTHER REFERENCES

Radio Amateur's Handbook 40th Ed., 1963, pp. 63–65, 223, 232–236.

ROBERT L. GRIFFIN, *Primary Examiner.*

R. K. ECKERT, *Assistant Examiner.*